(12) United States Patent  
Williams

(10) Patent No.: US 12,506,274 B2  
(45) Date of Patent: Dec. 23, 2025

(54) COMPACT ANALOG BEAMFORMERS AND MICROWAVE RADAR SYSTEMS CONTAINING THE SAME

(71) Applicant: General Radar Corporation, Belmont, CA (US)

(72) Inventor: Jon Williams, San Francisco, CA (US)

(73) Assignee: General Radar Corporation, Belmont, CA (US)

( * ) Notice: Subject to any disclaimer, the term of this patent is extended or adjusted under 35 U.S.C. 154(b) by 195 days.

(21) Appl. No.: 18/240,782

(22) Filed: Aug. 31, 2023

(65) Prior Publication Data

US 2024/0145932 A1    May 2, 2024

Related U.S. Application Data

(60) Provisional application No. 63/420,865, filed on Oct. 31, 2022.

(51) Int. Cl.
*H01Q 15/06* (2006.01)
*G01S 7/03* (2006.01)
(Continued)

(52) U.S. Cl.
CPC ............ *H01Q 15/06* (2013.01); *G01S 7/032* (2013.01); *G01S 13/426* (2013.01); *H01Q 3/36* (2013.01);
(Continued)

(58) Field of Classification Search
CPC ........... G01S 13/426; G01S 2013/0254; G01S 2013/0263; G01S 7/03; G01S 7/032;
(Continued)

(56) References Cited

U.S. PATENT DOCUMENTS 6,031,501 A * 2/2000 Rausch .............. H01Q 21/0031  
                                                             343/768  
6,904,197 B2 * 6/2005 Bhagavatula .......... G02B 6/262  
                                                             385/33

(Continued)

OTHER PUBLICATIONS

Ibbotson, "The Design and Analysis of a Rotman Lens with Reduced Conjugate-Port Coupling," Thesis for the degree of Master of Science in Engineering, Stellenbosch University, Dec. 2012, 87 pages.

*Primary Examiner* — Peter M Bythrow
(74) *Attorney, Agent, or Firm* — Fish & Richardson P.C.

(57) ABSTRACT

Microwave radar systems using compact form factor devices are described. Examples of such devices include a "folded" beamformer. The beamformer includes: a linear array of microwave antennas; a principal plane including: a Rotman lens; a first set of coplanar microwave waveguides; and a second set of coplanar microwave waveguides; and a series of one or more first planes parallel to the principal, each first plane including the first set of waveguides. Each plane of the beamformer includes one or more sets of miter bends, each set of miter bends configured to redirect waveguides of the first or second set. The beamformer can be configured for use in a radar system, either as a receiver (RX) beamformer, a transmitter (TX) beamformer, or as a combined transceiver (TRX) beamformer. The radar system can also include a second beamformer for receiving and transmitting using two separate beamformers.

30 Claims, 8 Drawing Sheets

(51) Int. Cl.
*G01S 13/02* (2006.01)
*G01S 13/42* (2006.01)
*H01Q 3/36* (2006.01)
*H01Q 17/00* (2006.01)

(52) U.S. Cl.
CPC ...... *H01Q 17/00* (2013.01); *G01S 2013/0263* (2013.01)

(58) Field of Classification Search
CPC ...... H01Q 15/06; H01Q 17/00; H01Q 25/008; H01Q 3/36
See application file for complete search history.

(56) References Cited

U.S. PATENT DOCUMENTS

| | | | |
|---|---|---|---|
| 7,724,197 B1* | 5/2010 | Hardie | H01Q 3/40 343/754 |
| 7,728,772 B2* | 6/2010 | Mortazawi | H01Q 21/245 342/375 |
| 8,344,937 B2 | 1/2013 | Drake et al. | |
| 11,699,861 B2* | 7/2023 | Williams | G01S 13/931 343/700 R |
| 2007/0285314 A1* | 12/2007 | Mortazawi | H01Q 1/3233 343/756 |
| 2011/0175780 A1* | 7/2011 | Gatti | H01Q 21/005 343/766 |
| 2013/0027240 A1* | 1/2013 | Chowdhury | G01S 13/345 342/175 |
| 2018/0059215 A1 | 3/2018 | Turbiner et al. | |
| 2020/0083611 A1* | 3/2020 | Hasegawa | H01P 5/12 |
| 2022/0029311 A1* | 1/2022 | Lam | H01Q 21/065 |

\* cited by examiner

COMPACT ANALOG BEAMFORMERS AND MICROWAVE RADAR SYSTEMS CONTAINING THE SAME

CROSS-REFERENCE TO RELATED APPLICATIONS

This application claims the benefit under 35 U.S.C. § 119(e) of the filing date of U.S. Provisional Patent Application No. 63/420,865, filed on Oct. 31, 2022, entitled "Compact Analog Beamformers and Microwave Radar Systems Containing the Same," the entirety of which is herein incorporated by reference.

GOVERNMENT LICENSE RIGHTS

This invention was made with government support under contract No. FA86492000056 awarded by the Department of Defense and the United States Air Force. The government has certain rights in the invention.

FIELD

The subject matter described herein relates generally to compact analog beamformers and microwave radar systems containing the same.

BACKGROUND

This specification generally describes microwave radar systems, e.g., radar imaging systems, using analog beamformers, e.g., Rotman lens based beamformers.

Certain phased array radar systems use a beamformer to manipulate the phases of transmitted radio waves in order to create a pattern of constructive and destructive wave interference. A suitably crafted pattern can steer an outgoing beam of radio waves in a desired direction. The beamformer, or a second beamformer, can be used analogously as a receiver to determine a direction of incoming radio waves.

In modern radar systems, in order to achieve superior resolution and range, it is desirable to maintain a broad bandwidth with minimal losses throughout the system. Moreover, a growing focus toward imaging radar systems is pushing the frequency range for phased array systems into the high-frequency microwave spectrum, e.g., the millimeter-wave (mmW) range and beyond. However, achieving a constant progressive phase shift between adjacent antennas in an array, over a wide bandwidth, is a significant challenge for beamformers at mmW frequencies.

SUMMARY

This specification describes a microwave radar system using compact form factor devices. The compact form factor is achieved, in part, using beamformers that include a Rotman lens and two sets of "folded" waveguides coupled to the Rotman lens. Waveguides transport electromagnetic waves along a fixed path by confining the electromagnetic field within an extended structure. The original meaning referred to conductive hollow pipes or tubes that confine, for example, microwaves between the inner conducting surfaces of the pipes. More generally, waveguides can encompass any device capable of guiding electromagnetic waves with minimal or no energy loss, e.g., dielectric waveguides, optical fibers, etc. A Rotman lens coupled to two set of waveguides can be configured to phase-shift electromagnetic waves guided between them. This can be utilized, for instance, to generate a progressive phase shift across a linear antenna array, forming a beam that points in a particular direction. With respect to the compact beamformers described herein, the folded waveguide geometry can facilitate access to electromagnetic signals upstream and/or downstream from the Rotman lens to provide coupling with additional functional components, such as amplifiers and control modules, without significantly adding to the size of the radar system containing such components. In addition, the beamformer's folded waveguide geometry can support any desired lengths of delay lines while maintaining a high density of waveguiding components, which can provide high angular resolution scanning within a field of view of the radar system.

In general, in a first aspect, this specification describes a beamformer. The beamformer includes: a linear array of microwave antennas configured to transmit or receive microwave signals within a field of view of the beamformer; a principal plane including: a Rotman lens including a dielectric insert bounded by a set of array ports and a set of beam ports opposite one another along a first direction, the dielectric insert configured to guide microwave signals between the set of array ports and the set of beam ports; a first set of coplanar microwave waveguides, each waveguide of the first set configured to guide microwave signals between a corresponding one of the array ports and a corresponding one of the antennas; and a second set of coplanar microwave waveguides, each waveguide of the second set configured to guide microwave signals to or from a corresponding one of the beam ports; and a series of one or more first planes parallel to the principal plane, each first plane including the first set of waveguides directed in the first direction. Each plane of the beamformer includes one or more sets of miter bends, each set of miter bends configured to redirect waveguides of the first or second set, each miter bend of each set redirecting a corresponding one of the waveguides to or from a second direction orthogonal to the principal plane.

In some implementations, the linear array of antennas is arranged along a third direction orthogonal to both the first and second directions.

In some implementations, one of the first planes has a first set of miter bends redirecting waveguides of the first set to the antennas, and the first set of miter bends are collinear along the third direction.

In some implementations, the Rotman lens is configured to phase-shift microwave signals guided between the set of array ports and the set of beam ports.

In some implementations, phase shifts of microwave signals correspond to directions of microwave signals transmitted or received by the antennas within the field of view of the beamformer.

In some implementations, the beamformer further includes a microwave amplifier coupled to each waveguide of the first set and configured to amplify microwave signals guided by the first set of waveguides.

In some implementations, the amplifier is coupled to each waveguide of the first set by a respective pair of waveguide-to-microstrip transitions.

In some implementations, one of the first planes has a second set of miter bends and a third set of miter bends redirecting waveguides of the first set to the amplifier, and the amplifier is coupled to each waveguide of the first set between a corresponding one of the miter bends of the second set and a corresponding one of the miter bends of the third set.

In some implementations, miter bends of the second and third sets are displaced in the first direction to offset couplings to the amplifier.

In some implementations, the beamformer further includes a series of one or more second planes parallel to the principal plane, each second plane including the second set of waveguides directed in the first direction. The principal plane is between the first planes and the second planes.

In some implementations, the beamformer further includes a set of lens ports configured to transmit or receive microwave signals out of or in to the beamformer, each waveguide of the second set configured to guide microwave signals between a corresponding one of the beam ports and a corresponding one of the lens ports.

In some implementations, the principal plane or one of the second planes has a fourth set of miter bends redirecting waveguides of the second set to the set of lens ports.

In some implementations, miter bends of the fourth set are collinear along the third direction.

In some implementations, miter bends of the fourth set are displaced in the first direction to offset the lens ports.

In some implementations, each plane of the beamformer has a corresponding set of miter bends for each adjacent plane, and the first set of waveguides are redirected between the principal plane and the first planes by corresponding sets of miter bends.

In some implementations, the second set of waveguides are redirected between the principal plane and the second planes by corresponding sets of miter bends.

In some implementations, miter bends of one or more of the corresponding sets are displaced in the first direction to alter path lengths of microwave signals guided by, at least one of, the first or second set of waveguides.

In some implementations, the Rotman lens further includes a set of dummy ports bounding the dielectric insert, the dummy ports are arranged between the set of array ports and the set of beam ports, the dielectric insert is configured to guide spillover microwave signals from the set of array ports and the set of beam ports to the set of dummy ports, and the set of dummy ports is configured to suppress reflections of spillover microwave signals within the dielectric insert.

In some implementations, the principal plane further includes: one or more microwave absorbers bounding the set of dummy ports, each absorber configured to absorb spillover microwave signals guided to the set of dummy ports.

In some implementations, the principal plane further includes: a set of microwave dummy loads configured to absorb spillover microwave signals; and a third set of coplanar microwave waveguides, each waveguide of the third set configured to guide spillover microwave signals from a corresponding one of the dummy ports to a corresponding one of the dummy loads.

In some implementations, the dielectric insert has a biconvex shape with a first radius of curvature and a second radius of curvature, the set of array ports are arranged on a first contour of the dielectric insert having the first radius of curvature, and the set of beam ports are arranged on a second contour of the dielectric insert having the second radius of curvature.

In some implementations, the first radius of curvature is greater than the second radius of curvature.

In some implementations, each waveguide of the first set includes a first polarization rotator configured to rotate polarizations of microwave signals by a first angle.

In some implementations, each waveguide of the second set includes a second polarization rotator configured to rotate polarizations of microwave signals by a second angle.

In some implementations, the array ports are contiguous with one another, and the beam ports are contiguous with one another.

In some implementations, the dielectric insert is composed of quartz.

In some implementations, the waveguides of the first and second sets are hollow tubes.

In some implementations, the antennas are horn antennas.

In some implementations, the microwave signals are in a frequency range from 76 GHz to 81 GHz.

In some implementations, the field of view of the beamformer has an angular resolution of 2 degrees or less.

In some implementations, the beamformer is configured for use in a radar system.

In a second aspect, this specification describes a radar system. The radar system includes: a receiver (RX) beamformer; and a transmitter (TX) beamformer.

The RX beamformer includes: a linear array of RX microwave antennas configured to receive microwave signals reflected from objects within a field of view of the radar system; a RX principal plane including: a RX Rotman lens including a set of RX array ports and a set of RX beam ports; a first set of coplanar RX microwave waveguides, each RX waveguide of the first set configured to guide microwave signals to a corresponding one of the RX array ports from a corresponding one of the RX antennas; and a second set of coplanar RX microwave waveguides, each RX waveguide of the second set configured to guide microwaves signals from a corresponding one of the RX beam ports; and a series of one or more first RX planes parallel to the RX principal plane, each first RX plane including the first set of RX waveguides.

The transmitter (TX) beamformer includes: a linear array of TX microwave antennas configured to transmit microwave signals toward objects within the field of view of the radar system; a TX principal plane including: a TX Rotman lens including a set of TX array ports and a set of TX beam ports; a first set of coplanar TX microwave waveguides, each TX waveguide of the first set configured to guide microwave signals from a corresponding one of TX array ports to a corresponding one of the TX antennas; and a second set of coplanar TX microwave waveguides, each TX waveguide of the second set configured to guide microwave signals to a corresponding one of TX beam ports; and a series of one or more first TX planes parallel to the TX principal plane, each first TX plane including the first set of TX waveguides.

In some implementations, the RX beamformer further includes: a series of one or more second RX planes parallel to the RX principal plane, each second RX plane including the second set of RX waveguides, where the RX principal plane is between the first RX planes and the second RX planes.

In some implementations, the TX beamformer further includes: a series of one or more second TX planes parallel to the TX principal plane, each second TX plane including the second set of TX waveguides, where the TX principal plane is between the first TX planes and the second TX planes.

In some implementations, the RX beamformer further includes a RX microwave amplifier coupled to each RX waveguide of the first set and configured to amplify microwave signals guided by the first set of RX waveguides.

In some implementations, the TX beamformer further includes a TX microwave amplifier coupled to each TX waveguide of the first set and configured to amplify microwave signals guided by the first set of TX waveguides.

In some implementations, the radar system further includes: an electronic control module in communication with the RX and TX beamformers, the electronic control module programmed to correlate reception of microwave signals by the RX beamformer and transmission of microwave signals by the TX beamformer to determine information about objects within the field of view of the radar system.

In some implementations, the electronic control module is configured to receive microwave signals guided by the second set of RX waveguides and transmit microwave signals guided by the second set of TX waveguides.

In some implementations, the electronic control module includes: a waveform generator programmed to generate a conditioning signal; a serializer/deserializer ("SERDES") including: a serializer programmed to serialize transmitted microwave signals conditioned on the conditioning signal; and a deserializer programmed to deserialize received microwave signals; and a pulse compressor programmed to process desearilized microwave signals and the conditioning signal to correlate received microwave signals and transmitted microwave signals.

In some implementations, the RX and TX beamformers are arranged so that the linear arrays of RX antennas and TX antennas are perpendicular to one another.

In some implementations, a number of RX array ports is equal to a number of TX array ports.

In some implementations, a number of RX beam ports is less than a number of TX beam ports.

In some implementations, the microwave signals are in a frequency range from 76 GHz to 81 GHz.

In some implementations, the field of view of the radar system has an angular resolution of 2 degrees or less.

Particular embodiments of the subject matter described in this specification can be implemented so as to realize one or more of the following advantages.

Folded Rotman lens based beamformers described herein are reliable and efficient true-time-delay (TTD) devices that can support frequency independent beamforming, e.g., wide bandwidths, for millimeter-wave (mmW) radar systems. Despite numerous challenges arising from relatively small characteristic lengths, the folded geometry of the beamformers provides a means for employing amplifiers and delay lines in a high density, compact form factor mmW radar system, which can significantly enhance angular resolution and signal-to-noise ratio in both reception and transmission. The beamformers described in this specification can provide near ideal performance for phased array radar systems at a fraction of the cost of traditional schemes, e.g., active electronically scanned arrays (AESAs).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Range-finding systems utilize reflected waves to discern the presence, distance, and/or velocity of objects. Radio Detection and Ranging (radar) and other range-finding systems have been employed in a variety of applications such as remote sensing, autonomous vehicles (e.g., self-driving cars, self-flying planes), wireless communications (e.g., 5G telecommunications), satellite, and air-defense systems, to name a few.

A radar system can include one or more optimized beamformers, which can enable high resolution azimuthal scanning, elevation scanning, or a combination thereof. Azimuth resolution is the ability of a radar system to distinguish between objects at similar range but different bearings. Elevation resolution is the ability of a radar system to distinguish between objects at similar range but different elevation. Angular resolution of a radar system generally depends on (among other properties) an antenna angular beam width, often represented by a −3 dB angle, defined by the half-power (−3 dB) points. In some implementations, the radar systems (or phased array systems) disclosed herein can have a −3 dB angular width of about 2 degrees or less in azimuth resolution, elevation resolution, or both. In particular, the radar systems described herein can achieve improved azimuth resolution and elevation resolution, relative to conventional systems, by exploiting two analog beamformers with linear antenna arrays arranged perpendicularly to one another. Both beamformers can include a respective "folded" Rotman lens and waveguiding geometry as a compact, high-density phase-shifting network.

Rotman lenses are attractive devices due to their cost effectiveness, reliability, broadband operation, and wide-angle scanning capabilities (large fields of view). A suitably designed Rotman lens based beamformer can provide near ideal performance for phased array radar applications, e.g., microwave imaging systems, remote-piloted vehicles, collision-avoidance systems, wideband communications, and more. Moreover, the folded beamformers described in this specification can enable access to signals upstream and/or downstream from the Rotman lens for adequate coupling to amplifiers, as well as implementation of delay lines, without significantly increasing a total size of a radar system containing the beamformers.

Figure 1:
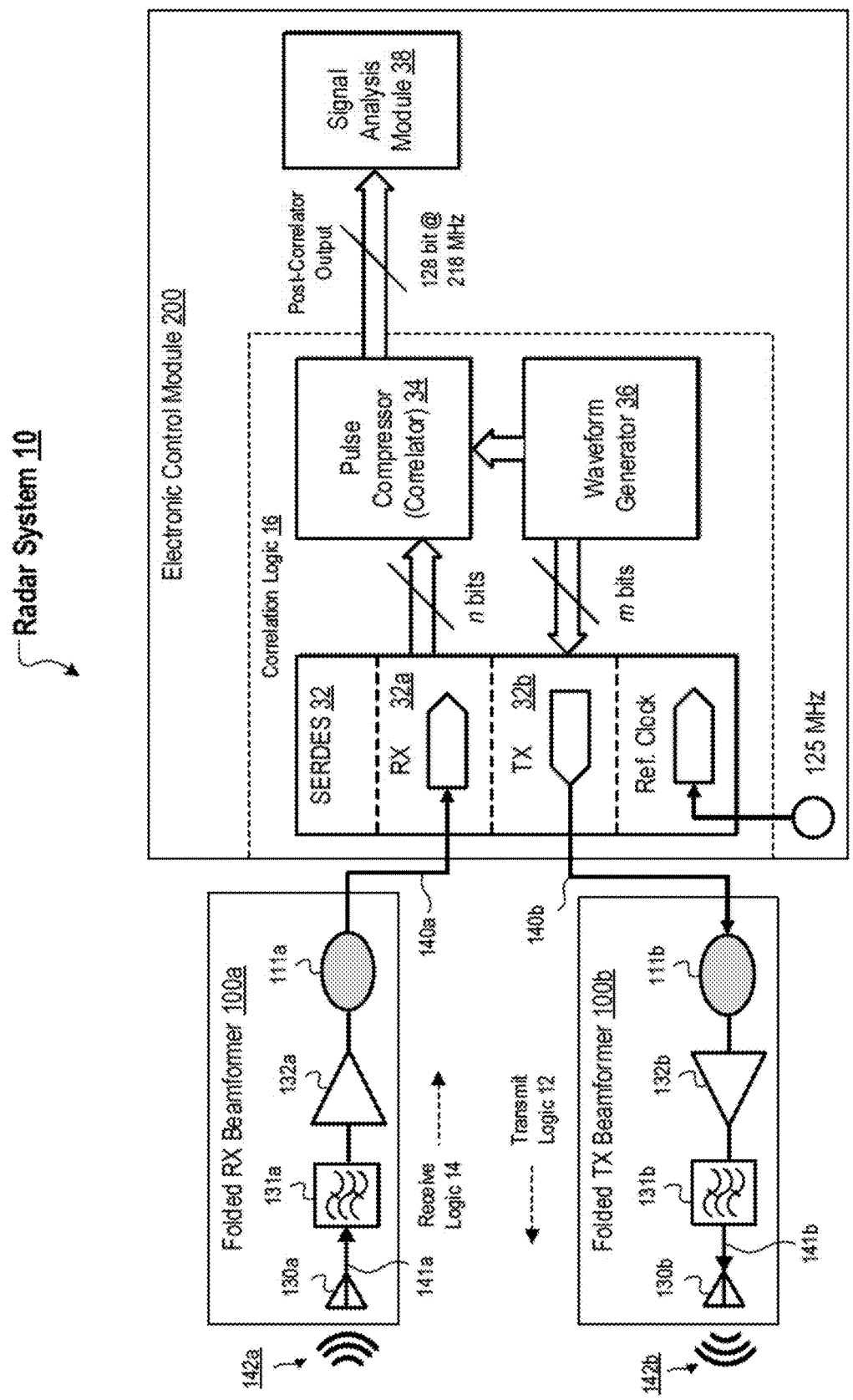
FIG. 1 is a schematic diagram depicting an example of a radar system including folded beamformers.

FIG. 1 is a schematic diagram depicting an example of a radar system 10 having the abovementioned functionalities. The radar system 10 can include a millimeter wave radar that emits a millimeter-wave (mmW) signal, e.g., a low power mmW signal, operating in a frequency range of about 76 GHz to 81 GHz (with a corresponding wavelength of about 4 mm). In other examples, radar system 10 operates in other microwave frequency ranges below 76 GHz or above 81 GHz with suitable alterations to components of the radar system 10. As described herein, the microwave spectrum refers to the frequency range from 300 megahertz (MHz) to 300 gigahertz (GHz). The mmW spectrum refers to the (extremely) high-frequency (EHF) microwave frequency range from 30 GHz to 300 GHz.

A conventional radar system uses radio waves transmitted by a transmitting antenna and received by a receiving antenna to detect objects. Phased array radar systems manipulate the phases of radio waves transmitted by a transmitter beamformer, creating patterns of constructive and destructive interference to steer a beam of radio waves in a desired direction. The phased array system can receive radio waves reflected from objects with a receiver beamformer to determine their relative positions and orientations.

In general, the radar system 10 can include any number of elements of a conventional radar system, a phased array radar system, an AESA (Active Electronically Scanned Array) radar system, a synthetic aperture radar (SAR) system, a MIMO (Multiple-Input Multiple-Output) radar system, and/or a phased-MIMO radar system. However, functional components of these systems tend to be prohibitively large and expensive which limits their applicability. A significant advantage of folded beamformers described in this specification is that they can replace numerous components, e.g., active phase-shifters of an AESA, to substantially reduce the size and cost of state-of-the-art radar systems.

Referring to FIG. 1, the radar system 10 includes two (folded) beamformers 100a and 100b, a receiver (RX) beamformer 100a and a transmitter (TX) beamformer 100b, arranged such that their respective linear antenna arrays 130a and 130b are perpendicular to one another. Details of folded beamformer 100 and Rotman lens 111 geometries will be discussed in the following.

RX beamformer 100a includes a linear array of microwave antennas 130a, a band pass filter 131a, a (low noise) microwave amplifier 132a, and a Rotman lens 111a. The antennas 130a are configured to receive incoming microwave signals 142a from a surrounding environment. The antenna array 130a relates directions of incoming signals 142a with relative phases of the received signals 141a. For example, an incoming plane wave 142a, orientated in a particular direction relative the array 130a, imparts a distribution of phases across the antennas 130a due to different antennas receiving wavefronts of the plane wave 142a at different times. The received microwave signals 141a can be filtered by the band pass filter 131a to isolate a desired frequency range (e.g., 76 GHz to 81 GHz) before being amplified by the amplifier 132a. The Rotman lens 111a phase-shifts the received microwave signals 141a such that an expected pattern of radiation is observed on input microwave signals 140a. Hence, the orientation of incoming signals 142a, for example, signals reflected from objects in the RX beamformer's 110a field of view, are imprinted onto the input signals 140a. The input signals 140a are then processed by an electronic control module 200.

TX beamformer 100b includes a linear array of microwave antennas 130b, a band pass filter 131b, a (low noise) microwave amplifier 132b, and a Rotman lens 111b. The Rotman lens 111b phase-shifts microwave signals 140b output by the electronic control module 200. Phase-shifted signals 141b are amplified by the microwave amplifier 132b which can be subsequently filtered by the band pass filter 131b to isolate the desired frequency range (e.g., 76 GHz to 81 GHz). The antenna array 130b is configured to transmit outgoing microwave signals 142b which are steered in directions dependent on the phase distribution across the array 130b. More precisely, an outgoing plane wave 142b can be formed by a superposition of phase-shifted signals 141b transmitted at each transmit antenna. The resulting constructive and deconstructive interference creates wavefronts propagating in a particular direction. Hence, a judicious choice of input signals 140b can steer outgoing waves 142b toward any desired direction within the TX beamformer's 100b field of view.

As mentioned above, the array of receive antennas 130a and the array of transmit antennas 130b can be arranged perpendicular to one another. Generally, the antennas 130a and 130b are sensitive to incoming 142a and outgoing 142b signals having a direction coplanar with their respective linear arrays. For example, the transmit array 130b can form two-dimensional (2D) fan beams with a mean direction coplanar with the array 130b. Thus, by receiving and transmitting in two orthogonal directions, as well as measuring time-of-flight, the radar system 10 can correlate received and transmitted signals to determine the spatial disposition of objects in a three-dimensional (3D) surrounding environment. Note, the receive 130a and transmit 130b antennas can be any suitable type of microwave antenna, e.g., microstrip patch arrays, Vivaldi antennas, slot coupled patches, microstrip Vivaldi antennas, horn antennas and others.

Received microwave signals 140a are processed by a correlator 34 of the electronic control module 200 to correlate them with transmitted microwave signals 140b. The processed data (i.e., post-correlator output) can be further processed by a signal analysis module 38 for object detection and recognition, constructing point cloud image data, as well as other analysis. In this case, to determine correlations, the radar system 10 includes a transmit logic 12, receive logic 14 and correlation logic 16 as illustrated in FIG. 1. The correlation logic 16 correlates the received signals 140a, as received and conditioned by the receive logic 14, with the transmitted signals 140b conditioned by the transmit logic 12 in order to find when, if at all, there is a high correlation between them.

Correlation logic 16 is implemented with a serializer/deserializer ("SERDES") 32, the correlator 34, and a waveform generator 36, coupled as shown (e.g., by logic gates of an FPGA) or as otherwise evident in view of the teachings hereof. SERDES 32 can include components as described in U.S. Pub. No. 2018/0059215 entitled "Beam-Forming Reconfigurable Correlator (Pulse Compression Receiver) Based on Multi-Gigabit Serial Transceivers (SERDES)", which is incorporated by reference herein in its entirety.

SERDES 32 includes a deserializer 32a and a serializer 32b that deserialize received signals 140a and serialize transmitted signals 140b, respectively. In general, deserializer 32a is configured to decode data imprinted on the received signal 140a along single bit receive lines. Similarly, serializer 32b is configured to encode data imprinted on the transmitted signals 140b along single bit transmission lines, respectively. For example, the serializer 32b can serialize multiple bytes of data into a stream of bits which can be carried efficiently by transmit signals 140b. The waveform generator 36 generates a conditioning signal (transmit logic 12) that is imparted onto the serialized transmitted signals. The correlator 34 processes the deserialized received signals (receive logic 14) and the conditioning signal to determine any relevant correlations (correlation logic 16) between received 140a and transmitted 140b signals. In other words, conditioning signals allow the correlator 34 to distinguish between noise (as well as other ambient signals) and the particular received microwave signals 140a that were originally transmitted 140b from the radar system 10.

Figure 2:
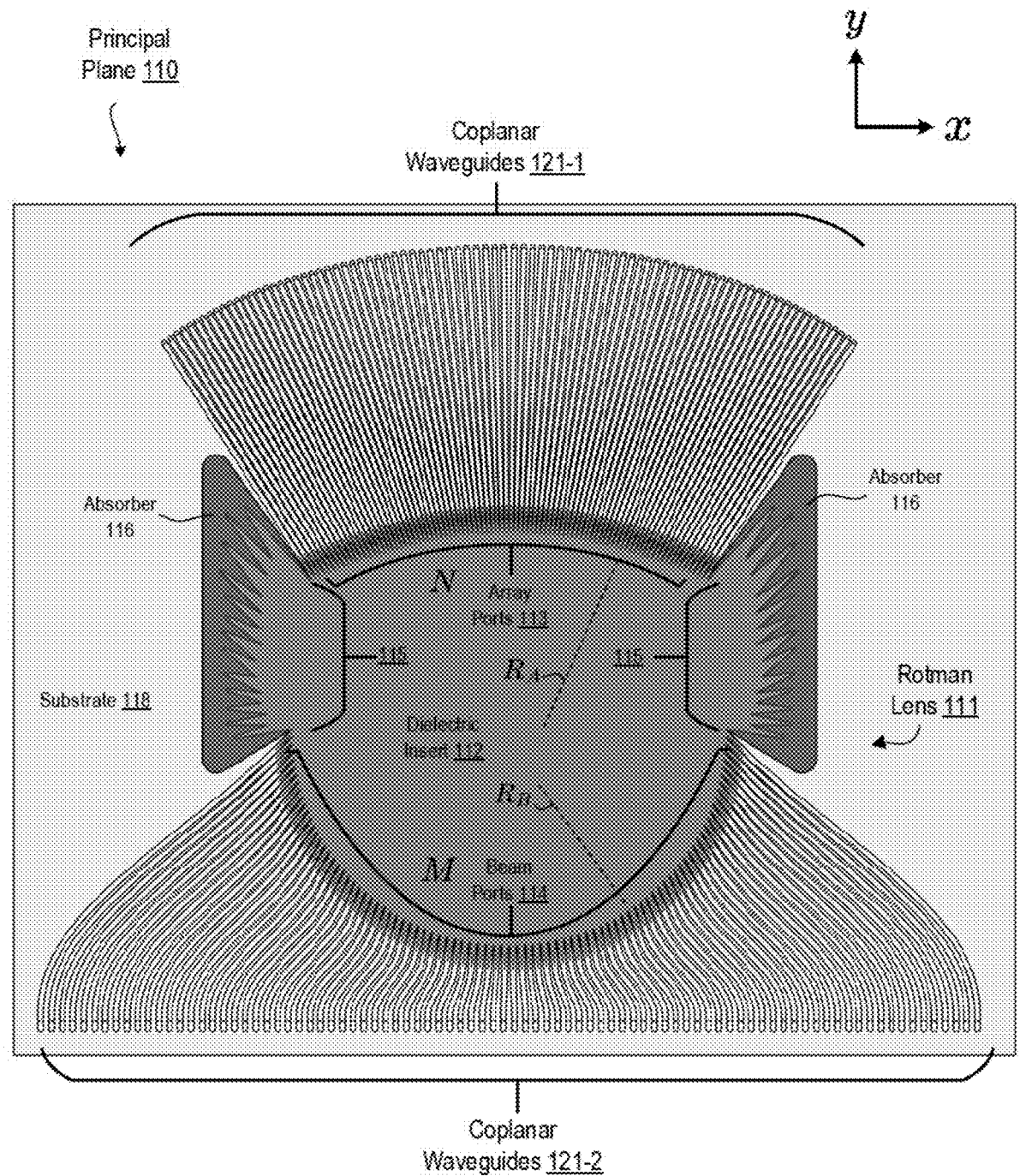
FIG. 2 is a top view depicting an example of a Rotman lens.

FIG. 2 is a top view depicting an example of a Rotman lens 111 that can serve as a robust phase-shifting network for beamformers, such as those included in the radar system 10. As will be exemplified in the following, Rotman lens 111 can be integrated into beamformers alongside folded waveguides to achieve compact form factors with a high density of waveguiding elements (see FIGS. 5, 6A, and 6B for example). Particularly, waveguides 122 shown in FIG. 2 can extend into parallel planes to facilitate access to microwave signals upstream and/or downstream from the Rotman lens 111, as well as implement any desired lengths of delay lines.

In general, a Rotman lens is a passive phase-shifting device that receives a set of microwave signals as input and outputs a set of phase-shifted signals that depend on the geometric structure and electromagnetic properties (e.g., refractive index) of the lens. The Rotman lens is a linear device in that the output signals are linear combinations of the input signals with associated phase shifts. The phase shifts can be tuned for any desired application; however, they are commonly exploited in phased array radar systems. This is because Rotman lenses allow (in TX operation) formation of multiple different antenna beams (e.g., directed at different angles relative an antenna array) without the need for switches or active phase shifters.

To achieve passive phase-shifting, Rotman lenses are composed of a number of functional ports, termed "array ports" and "beam ports", which constrain propagation of microwave signals to and from the Rotman lens. As their name implies, array ports direct signals to or from a linear antenna array, typically on a one-to-one basis. Beam ports can direct signals to or from an electron control module configured to receive or transmit microwave signals. Beam ports owe their name to the fact that each beam port is, generally, associated with a direction of a plane wave oriented with respect to the antenna array. The primary function of a Rotman lens is to guide microwave signals between the array and beam ports, within a dielectric insert (or a cavity), in such a way that phase shifts are tuned with the antenna array. For example, the Rotman lens can be configured such that excitation of any beam port reproduces the excitation signal across the array ports with linearly varying phase shifts, that is, a constant phase shift at each adjacent port. A linear antenna array with equidistant spaced radiating elements, coupled to the array ports, will emit a beam in a direction dependent on the phase shifts.

An example of a Rotman lens 111 that can perform the abovementioned functions is shown in FIG. 2. The Rotman lens 111 can be optimized for any particular mmW radar system to enhance angular resolution with low power loss. Design parameters such as the shape, dimensions, number of array ports, number of beam ports, spacing between ports (port density), dimensions of coupled waveguides, materials, and other parameters can be designed, e.g., using electromagnetic wave simulators (Rotman Lens Designer® (RLD)), to perform sufficiently well as to meet a predetermined threshold performance level for a particular implementation. For example, the design parameters can be adjusted appropriately if the Rotman lens 111 is configured for reception (RX) or transmission (TX), or a combination of both, to achieve a certain level of angular resolution.

Rotman lens 111 is arranged in a principal (lens) plane 110 and is loaded with a dielectric insert 112. The principal plane 110 refers to the plane where microwave signals are manipulated by the Rotman lens 111, that is, where microwave signals guided between the various ports are phase-shifted. In this case, the Rotman lens 111 has reflection symmetry in the principal plane 110 to facilitate symmetric fields of view for a beamformer, but asymmetric configurations are also possible in general. Dielectric insert 112 can be composed of any suitable dielectric material, e.g., vacuum, quartz, glass compositions, high-index plastics, among others. Quartz is a cheap and readily available dielectric material that can support shorter effective wavelengths. This property can reduce a total size of the Rotman lens 111 and increase performance. In some implementations, microwave signals are confined within the dielectric insert 112 via total internal reflection, but parallel plates can also be incorporated to increase confinement. Parallel plates refer to metal plates that are parallel to and arranged on either side of the principal plane 110 which redirect diverging microwave signals back into the dielectric insert 112.

The dielectric insert 112 has a biconvex shape and is bounded by a contiguous set of array ports 113 and a contiguous set of beam ports 114 that are arranged opposite to one another across the insert 112. Specifically, array 113 and beam 114 ports are organized on respective contours of the biconvex dielectric insert 112, where the contours have differing radii of curvature. In the described examples, the radius of curvature of the array port contour $R_A$ is greater than the radius of curvature of the beam port contour $R_B$, that is, $R_A > R_B$. This design is generally suitable for tuning phase shifts with a linear antenna array, but different designs are also possible, such as a dielectric insert 112 having an equiconvex shape with equal radii of curvature $R_A = R_B$. Among other design parameters, the number of array ports N and the number of beam ports M, as well as their respective curvatures, $R_A$ and $R_B$, affect the angular resolution of a Rotman lens 111 based beamformer 100. As shown in FIG. 2, the example Rotman lens 111 has N=88 array ports 113 and M=88 beam ports 114. When, implemented in a beamformer 100, this relatively high density of ports can support a relatively high angular resolution of about 2 degrees or less (see FIGS. 3A, 3B, 4A and 4B for example). The Rotman lens 111 can also include a set of dummy ports 115 bounding the periphery of the dielectric insert 112, between the array ports 113 and the beam ports 114, to provide reflectionless termination of microwave signals within the Rotman lens 111.

The Rotman lens 111 is interfaced by two sets of coplanar microwave waveguides, a first set 121-1 and a second set 121-2. Each waveguide 122 of the first 121-1 and second 121-2 sets accommodates a hollow space through which microwave signals propagate. The waveguides 122 can be configured to support different and/or multiple electromagnetic modes. However, suitably designed single-mode circular waveguides (e.g., hollow tubes) or rectangular waveguides are generally desirable. This eliminates modal dispersion which can be detrimental to Rotman lens 111 functionalities due to differing delay times of individual modes. To reduce crosstalk between neighboring waveguides 122, the waveguides 122 can be composed of any appropriate metallic alloy, such as brass, copper, or aluminum, to name just a few examples.

Each of the array ports 113 is coupled to a corresponding waveguide of the first set 121-1 and each of the beam ports 114 is coupled to a corresponding waveguide of the second set 121-2. The waveguides 122 guide microwave signals to or from their respective ports in order to perform various functions on the signals before or after they are manipulated by the Rotman lens 111. In general, when the Rotman lens 111 is implemented in a beamformer 100, the first set of waveguides 121-1 guide microwave signals to or from an antenna array on a one-to-one basis and the second set of waveguides 121-2 guide microwave signals to or from an electronic control module 200. However, other processes may be involved before or after the signals are transmitted or received by the antennas 130. For example, the first set of waveguides 121-1 can interface with an amplifier and/or a band pass filter to increase signal gain and/or isolate a particular frequency range. Alternatively, or in addition, waveguides 122 of the first set 121-1, the second set 121-2, or both can have varying lengths to implement delay lines, which alters relative path lengths (and therefore relative phases) of signals directed by different waveguides 122. This can be used to maintain and/or correct the phase shifts of microwave signals before or after the signals are manipulated by the Rotman lens 111.

Rotman lens 111 performs a linear transformation, similar to a discrete Fourier transform, on microwave signals guided between the array ports 113 and the beam ports 114. That is, microwave signals $A_n$ at the n=1, ..., N array ports 112 are related (approximately) to signals $B_m$, at the m=1, ..., M beam ports 113 by a series of phase shifts:

$$A_n = \frac{1}{M} \sum_{m=1}^{M} T_{nm} B_m,$$

$$B_m = \frac{1}{N} \sum_{n=1}^{N} R_{mn} A_n$$

$T_{nm}=\exp(-i\varphi_{nm})$ is the phase shift between the nth array port and the mth beam port when the Rotman lens 111 operates in TX. $R_{mn}=\exp(i\theta_{mn})$ is the phase shift between the mth beam port and the nth array port when the Rotman lens 111 operates in RX. In beamformer 100 applications, phase shifts generated by the Rotman lens 111 can be optimized for RX or TX operation, or joint operation if desired.

For TX operation, the shape of the Rotman lens 111 and lengths of coupled waveguides 122 are generally chosen such that a progressive phase taper (e.g., a linearly varying phase shift) is created on an antenna array 130. Thus, a beam is formed with a particular direction relative the array. Rotman lens 111 achieves this passively by manipulating path lengths of microwave signals guided within the dielectric insert 112. For example, if an mth of the beam ports 114 is excited with a microwave signal $B_m \neq 0$, the signal will be emitted with a semicircular wavefront into the dielectric insert 112 at a certain angle and distance from each of the array ports 113. Hence, wavefronts of the microwave signal will impinge on each array port n=1, ..., N at different times, creating a distribution of phase-shifted signals $$A_n = \frac{1}{M} T_{nm} B_m.$$

The superposition of phase-shifted signals $A_{n=1 \ldots N}$ corresponds to a particular direction $\Theta_m$ of the beam formed by the antenna array. To demonstrate, assume signals with constant phase shifts of $\varphi_{nm}$, =n$\varphi_m$, are transmitted by a linear antenna array 130 with radiating elements spaced a quarter-wavelength apart. The relative (coplanar) direction $\Theta_m$ of the transmitted beam, according to Fraunhofer diffraction, is approximately:

$$\sin \Theta_m = \frac{2}{N} - \frac{2\varphi_m}{\pi}$$

Hence, the excitation of a particular beam port m corresponds with a specific direction $\Theta_m$ of the resultant beam due to the constant phase shift $\varphi_m$, at each array port. By exciting different beam ports sequentially m=1, ..., M, the direction of the beam can be changed nearly instantaneously. Moreover, multiple beam ports can be excited simultaneously to generate complicated radiation patterns at the antenna array 130.

Figure 3A:
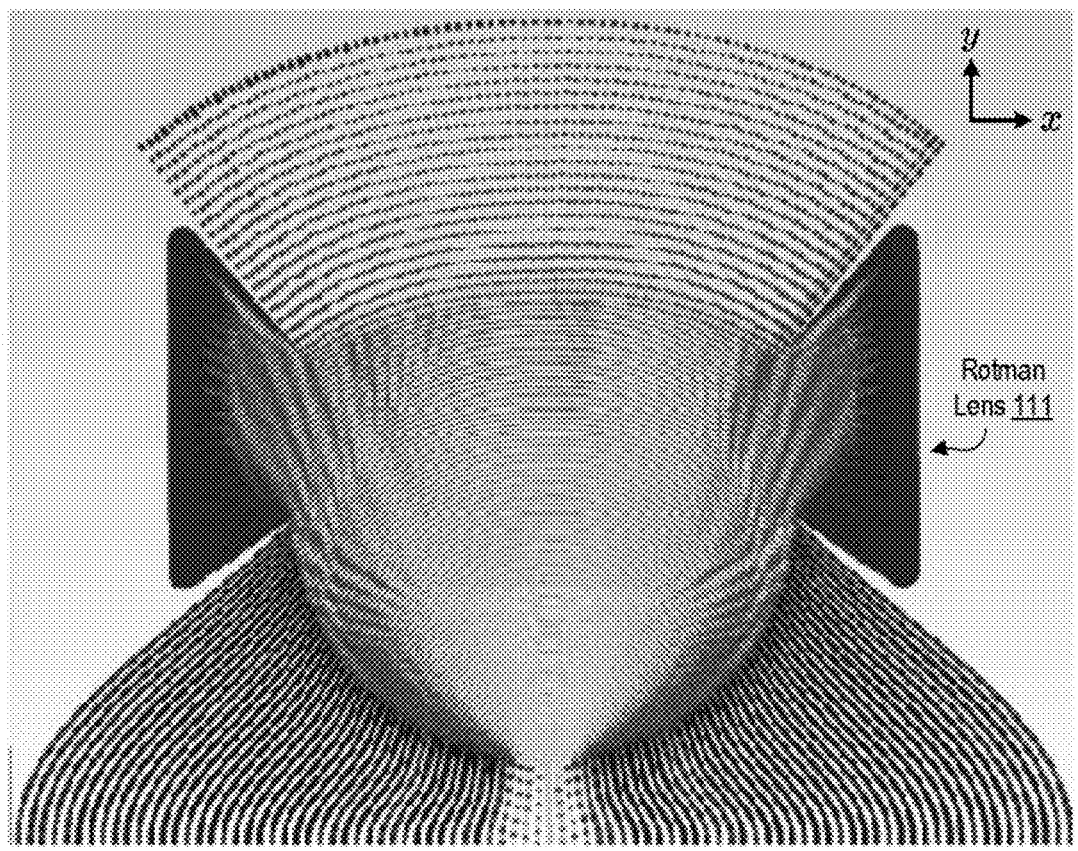
FIG. 3A is a grayscale map showing an example of a Rotman lens with an excited central beam port.

FIG. 3A is a grayscale map depicting an example of a Rotman lens 111 with a central beam port excited by a 78.5 GHz microwave signal. Light gray colors correspond to relatively high intensity signals and dark gray colors correspond to relatively low (approaching zero) intensity. As shown in FIG. 3A, due to the geometry of the Rotman lens 111, the central beam port is equidistant from each array port. Therefore, semicircular wavefronts of the microwave signal reach all the array ports 113 at the same time, generating no phase shifts across the array ports 113.

Figure 3B:
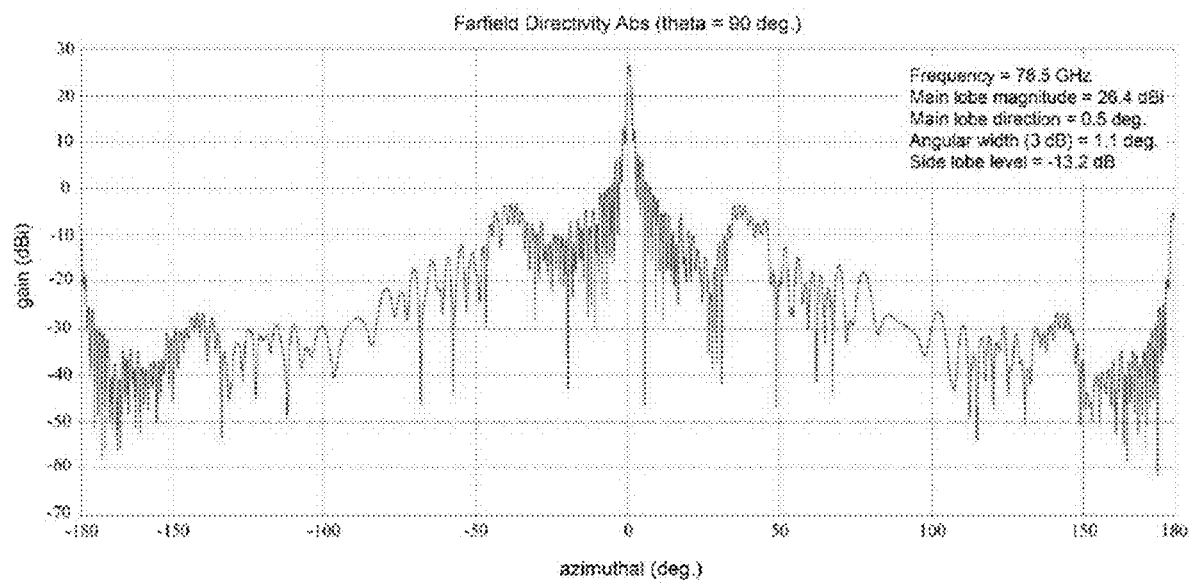
FIG. 3B is a farfield directivity plot of a linear antenna array coupled to the excited Rotman lens of FIG. 3A.

FIG. 3B is a farfield directivity plot of a linear antenna array 130 coupled via waveguides to the excited Rotman lens 111 of FIG. 3A. The plot shows the farfield intensity of microwave signals emitted in directions coplanar with the antenna array 130. Since no phase shifts are generated by central beam port excitation, signals carried by the waveguides reach the antenna array 130 in phase, forming a beam with a main lobe direction of 0.5 degrees (~0 degrees) relative the antenna array 130. The beam has a main lobe magnitude of 26.4 dBi, which represents the directional gain relative a perfect isotropic antenna. The angular width (−3 dB) corresponding to the angular resolution is 1.1 degrees.

Figure 4A:
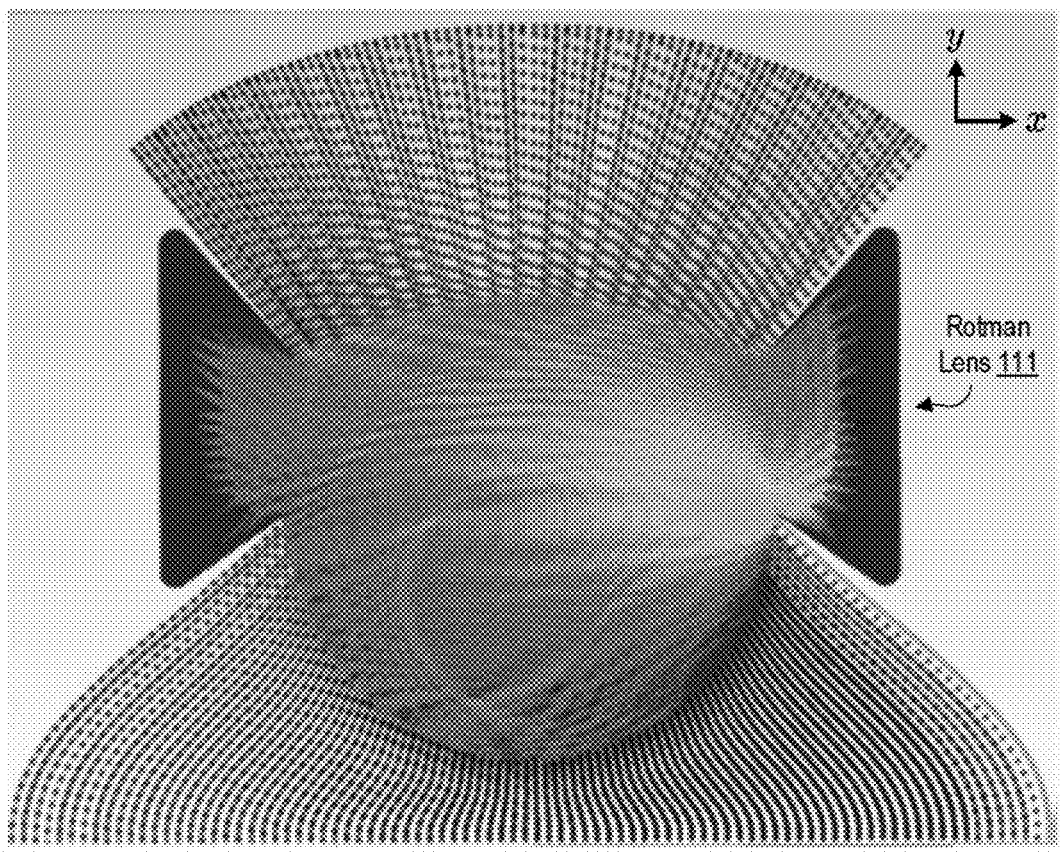
FIG. 4A is a grayscale map showing an example of a Rotman lens with an excited corner beam port.

FIG. 4A is a grayscale map depicting an example of a Rotman lens 111 with a corner (right-most) beam port excited by a 78.5 GHz microwave signal. Light gray colors correspond to relatively high intensity signals and dark gray colors correspond to relatively low (approaching zero) intensity. As shown in FIG. 4A, due to the geometry of the Rotman lens 111, the corner beam port is non-equidistant from each array port. Therefore, semicircular wavefronts of the microwave signal reach the array ports 113 at different times, generating a progressive phase shift across the array ports 113.

Figure 4B:
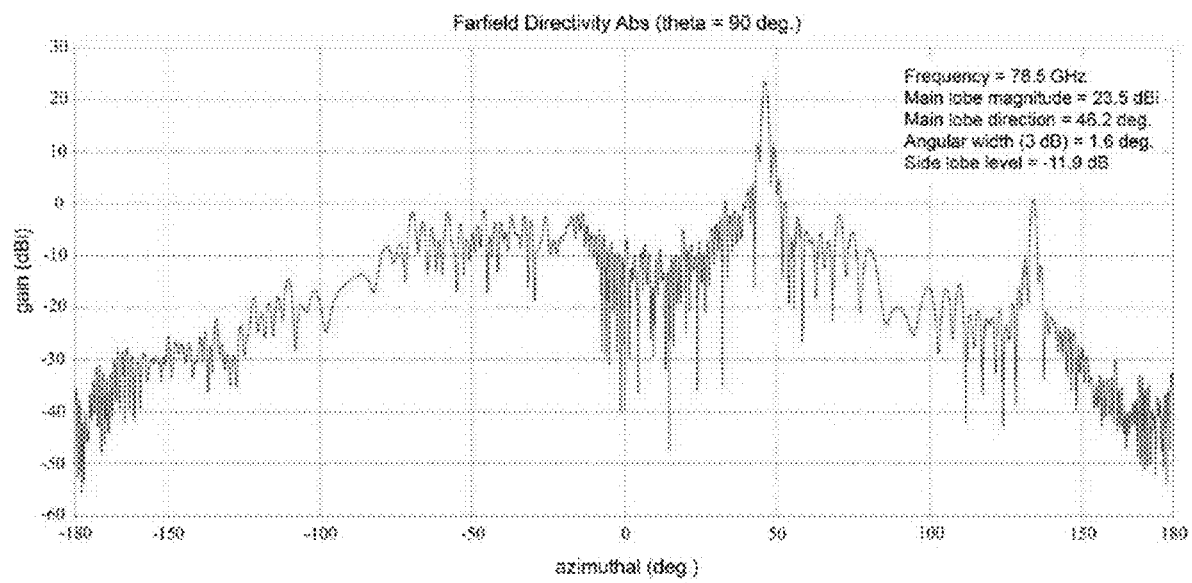
FIG. 4B is a farfield directivity plot of a linear antenna array coupled to the excited Rotman lens of FIG. 4A.

FIG. 4B is a farfield directivity plot of a linear antenna array coupled via waveguides to the excited Rotman lens 111 of FIG. 4A. The plot shows the farfield intensity of microwave signals emitted in directions coplanar with the antenna array. Since multiple phase shifts are generated by corner beam port excitation, signals carried by the waveguides reach the antenna array 130 out of phase, forming a beam with a main lobe direction of 46.2 degrees (~45 degrees) relative the antenna array 130. The beam has a main lobe magnitude of 23.5 dBi and an angular width (−3 dB) of 1.6 degrees.

Referring again to FIG. 2, the dielectric insert 112 predominately directs microwave signals between array ports 113 and beam ports 114 to implement appropriate phase-shifting and minimize power loss. However, due to the structure of Rotman lenses in general, spillover signals that propagate outside the bounds of the array 113 and beam 114 ports are usually unavoidable. If not mitigated against, spillover microwave signals can deteriorate Rotman lens 111 performance by generating multiple reflections and standing waves that interfere with phase-shifted signals.

To alleviate this problem, spillover signals are guided by the direct insert 112 to the dummy ports 115. Sidewall microwave absorbers 116 suppress reflections of spillover signals by absorbing microwaves directed to the dummy ports 115. The absorbers 116 can be composed of microwave absorbing materials such as Eccosorb® MCS, Eccosorb® LS, or Eccosorb® BSR. The dummy ports 115 are realized as sharp triangularly shaped "teeth" angled towards a central region of the dielectric insert 112. This allows effective dissipation of spillover signals in the sidewall absorbers 116 since the curvature of wavefronts are substantially normal to the pointing direction of the dummy ports 115. This is demonstrated more explicitly in the grayscale maps of FIG. 3A and FIG. 4A. In other implementations, the principal plane 110 can include a third set of microwave waveguides that are each coupled to a respective dummy port 115 to receive the spillover microwave signals. Each waveguide of the third set can then be coupled a respective microwave dummy load. The dummy loads can dissipate spillover microwave signals directed to the waveguides of the third set to mitigate reflections back into the dielectric insert 112. In these cases, dummy ports 115 are generally sized and shaped to resemble the array 113 and beam ports 115 which enables simpler coupling to waveguides.

As shown in FIG. 2, a substrate 118 hosts the Rotman lens 111, the first set of waveguides 121-1, and the second set of waveguides 121-2. The substrate 118 can be composed of metals (e.g., aluminum), metallic alloys, thermoplastics, or other materials, or combinations thereof. For example, the substrate 118 can be primarily composed of thermoplastics, and plated or coated with metals (e.g., gold) or metallic alloys to reduce weight.

Figure 5:
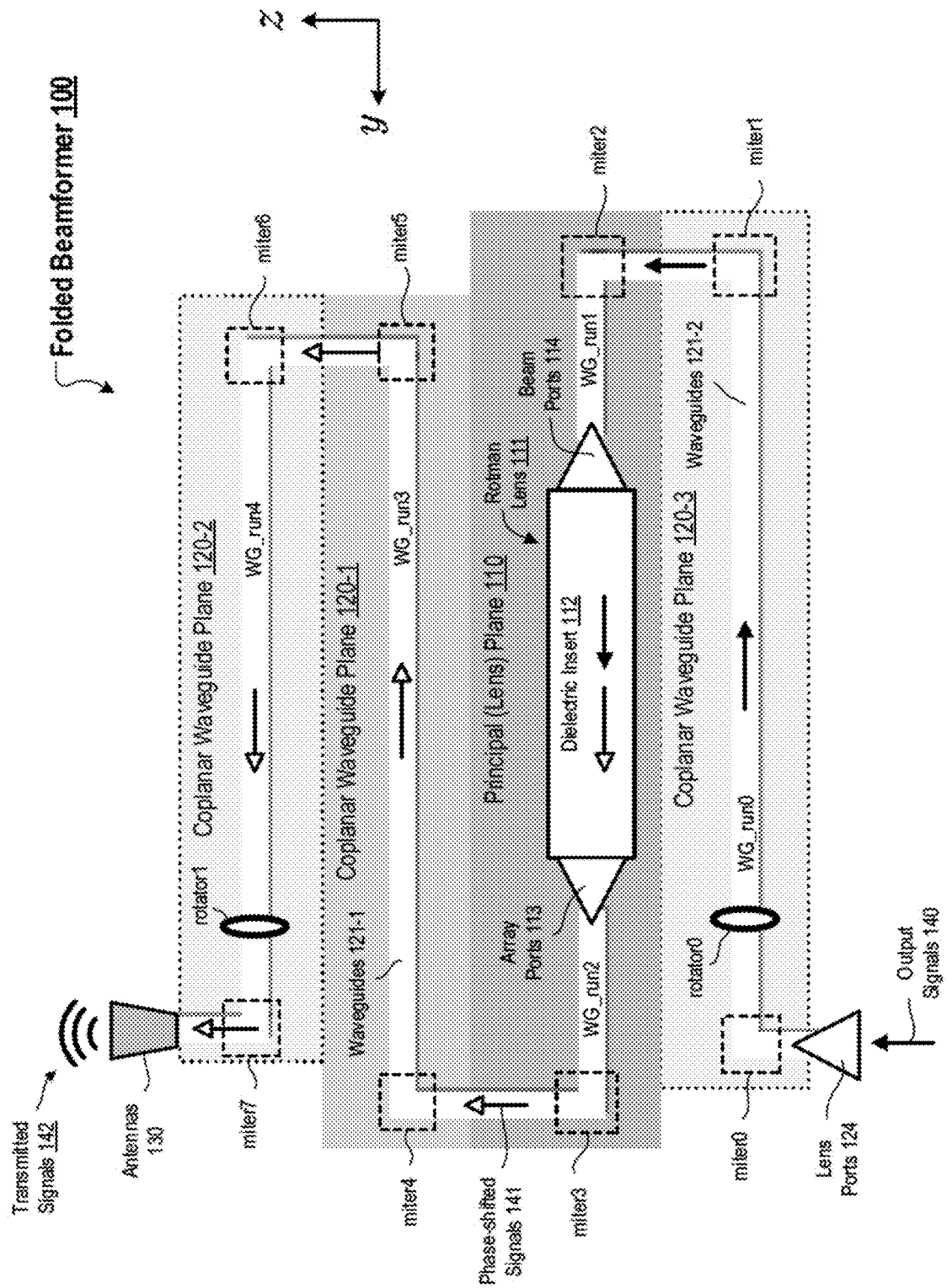
FIG. 5 is a schematic diagram depicting an example of a beamformer with a folded geometry.

FIG. 5 is a schematic diagram depicting an example of an analog beamformer 100 with a folded geometry. Folded beamformer 100 utilizes a Rotman lens 111 (e.g., FIG. 2) to phase-shift transmitted and/or received microwave signals. The Rotman lens 111 is a true-time-delay (TTD) device that supports frequency independent beam steering, e.g., wide bandwidths (short pulse durations). This is because phase shifts are a result of time delays created by differing path lengths to the antennas 130, which reduces adverse "squint" phenomena, e.g., wide beams, temporal distortion, loss of gain and resolution. Squint is a common problem in active phased arrays (AESA), a consequence of frequency dependent operation, which has pushed many radar systems towards TTD phase-shifting networks.

Nevertheless, conventional Rotman lens configurations have struggled to meet the performance demands (e.g., angular resolution and signal-to-noise ratio) of state-of-the-art mmW radar systems due to smaller characteristic lengths, as well as increased port and waveguide densities. Since the Rotman lens 111 realizes time delays passively, maintaining and/or correcting phase shifts generally involves altering lengths of waveguides 122, e.g., to form delay lines. The standard method involves deforming the waveguides 122 in the principal plane 110 (e.g., with multiple "S" shaped bends) to increase or decrease signal path lengths relative to one another. However, when a high density of ports and waveguides 122 are employed, e.g., in the Rotman lens 111 of FIG. 2, very little real estate, if any, is available for deformations. Further still, beamformers usually amplify microwaves before transmission or after reception from the antennas 130 to assure sufficient signal gain. When waveguides 122 are closely spaced, limited instruments exist to effectively couple to individual waveguides 122. This problem is compounded if waveguide transitions, e.g., waveguide-to-microstrip (WG-MS) transitions, are involved for amplification.

The folded beamformer 100 provides a solution to the abovementioned challenges, as well as offering a modular structure to modify different design features efficiently. Beamformer 100 exploits a third (z) dimension, orthogonal to the principal plane 110, to accommodate delay lines and amplifier interfaces while still preserving a high density of ports and waveguides 122. This facilitates compact form factors which can be implemented in phased array radar systems, e.g., the radar system 10 of FIG. 1, to significantly reduce the overall size of the radar systems. Moreover, since the folded beamformer 100 utilizes a Rotman lens 111, it can be implemented relatively cheaply compared with conventional approaches, e.g., AESAs, while achieving equivalent or superior performance.

For demonstrate purposes, beamformer 100 is described as operating in transmission (TX) but a similar configuration can be realized for reception (RX), or a combination thereof to realize a transceiver (TRX) beamformer. Output signals 140 generated, for example, by an electronic control module, are guided by a second set of coplanar waveguides 121-2 from lens ports 124 towards beam ports 114 of the Rotman lens 111. After propagating through a suitably shaped dielectric insert 112, resultant phase-shifted signals 141 are guided from array ports 113 to a linear antenna array 130 by a first set of coplanar waveguides 121-1. The antennas 130 emit a beam of transmitted signals 142 in a direction dependent on the phase shifts of the phase-shifted signals 141. Generally, the array of antennas 130 are spaced equidistant from adjacent antennas (e.g., about a half-wavelength or a quarter-wavelength apart) and the beamformer 100 is configured such that the phases of the phase-shifted signals 141 vary linearly (e.g., constant phase shifts) across the antenna array 130. Consequently, the beamformer 100 behaves as a compact phased array antenna system. That being said, any configuration of antennas and phase shifts can be implemented if desired, e.g., to form a beam (or multiple beams) with a particular beam shape, pattern, or directivity.

As shown in FIG. 5, coplanar waveguides 121-1 and 121-2 extend (in the y dimension) from the principal plane 110 into multiple planes parallel to the principal plane 110. In this example, the first set of waveguides 121-1 are directed into a first plane 120-1 and a second plane 120-2, while the second set of waveguides 121-2 are directed into a third plane 120-3. However, the first 121-1 and second 121-2 sets of waveguides can extend into any number of planes depending on the implementation. In some cases, only one set of waveguides 121-1 or 121-2 extends into different planes. For example, a high density of beam ports 114 may not be desired in some implementations, e.g., when the beamformer 100 operates in RX, in which case the third plane 120-3 may not be involved. Here, waveguide runs (WG_run0, WG_run1, WG_run3, and WG_run4) indicate relatively long extensions of waveguides where delay lines, interfaces with amplifiers, and/or interfaces with control modules can be implemented.

Figure 6A:
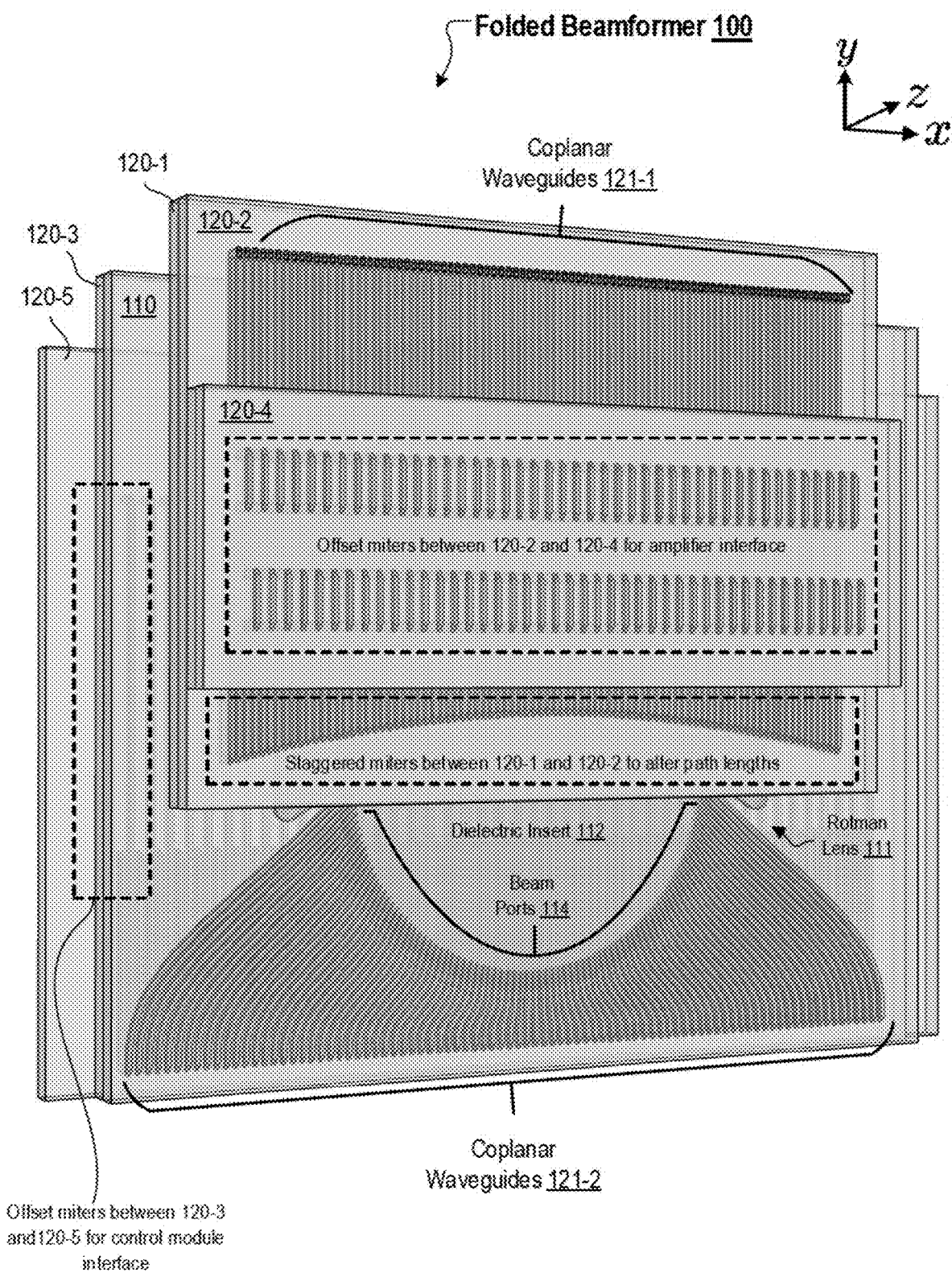
FIG. 6A is an isometric render depicting an example of a beamformer with a folded geometry.
Figure 6B:
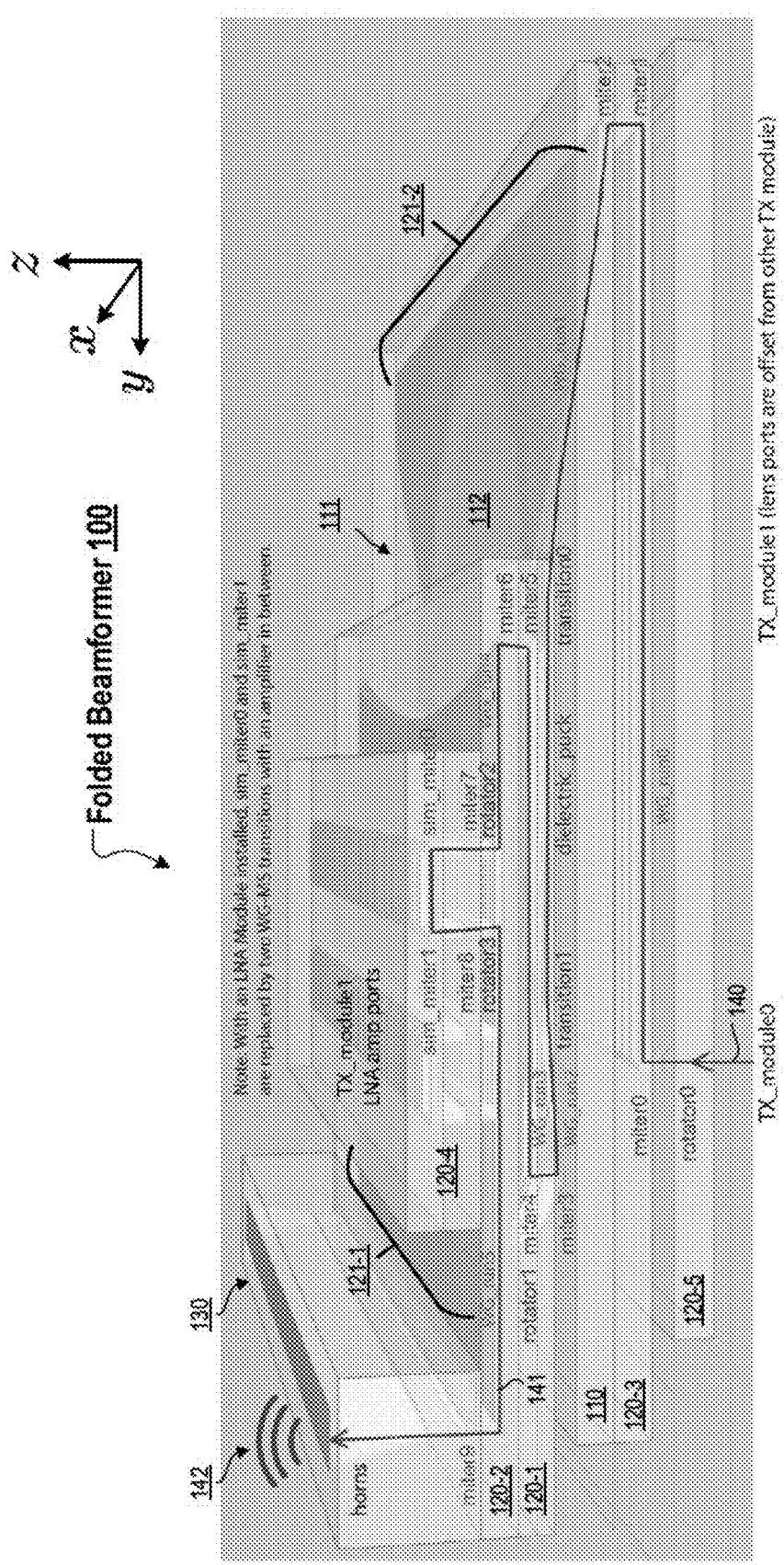
FIG. 6B is a side view render depicting the example beamformer of FIG. 6A, including antennas.

To traverse between planes 110 and 120-3, the second set of waveguides 121-2 is redirected by three sets of miter bends: miter0, miter1, and miter2 in their respective planes. Likewise, the first set of waveguides 121-1 is redirected between planes 110, 120-1, and 120-2, by five sets of miter bends: miter3, miter4, miter5, miter 6, and miter7. Each miter bend of each set redirects a corresponding waveguide 122 on a one-to-one basis. In particular, miter bends redirect waveguides 122 by 90 degrees such that waveguides 122 can traverse between planes in the z dimension. As shown in FIG. 5, the waveguides 122 generally backtrack between adjacent planes, that is, the waveguides 122 perform 180 degree "U-turns" between planes using a corresponding set of miter bends for each adjacent plane. For example, the first set of waveguides 121-1 is redirected between the principal plane 110 and the first plane 120-1 with two corresponding sets of miter bends, miter3 and miter4, that implement a 180-degree turn. Additionally, the first set of waveguides 121-1 is redirected between the first plane 120-1 and the second plane 120-2 with corresponding sets of miter bends, miter5 and miter 6, implementing another 180-degree turn. This scheme can accommodate compact folded structures since waveguides 122 are overlaid with one another and the Rotman lens 111. However, the waveguides 122 can also perform an effective 0 degree turn between adjacent planes which can be useful in some scenarios, e.g., coupling to amplifiers. In general, the waveguides 122 can be redirected into adjacent planes numerous times with different combinations of miter bends to support complex folded waveguide geometries. Examples of such geometries are shown in FIGS. 6A and 6B.

Each plane and their associated sets of miter bends enables a specific function of the beamformer 100 while preserving a compact form factor and high component density. For example, beamformer 100 can interface the second set of waveguides 121-2 with an electronic control module using the third plane 120-3. Each miter bend of miter0 can be individually displaced in the y dimension to offset lens ports 124 to the waveguides 121-2. This affords more space for the control module to couple to individual waveguides. In some implementations, for example when beamformer 100 operates in RX, the control module can couple to the second set of waveguides 121-2 in the principal plane 110. An RX beamformer generally has a fewer number of beam ports 114 than a TX beamformer and therefore may not involve the third plane 120-3. However, both RX and TX beamformers can have a large number of array ports 113 to support enhanced angular resolution, therefore at least one plane, e.g., the first plane 120-1, is generally involved.

As another example, beamformer 100 can implement delay lines for the first set of waveguides 121-1 using the first plane 120-1 and the second plane 120-2. Each miter bend of miter5 and miter6, corresponding to a particular waveguide 122, can be displaced in the y dimension to increase or decrease path lengths to the antennas 130, without deforming the waveguides 121-1 in any of the planes. For example, with respect to the beamformer 100 of FIG. 5, displacing a corresponding miter bend of miter5 and miter6 in the +y direction increases the path length to an antenna, while displacing them in the −y direction decreases the path length. Alternatively, or in addition, beamformer 100 can interface the first set of waveguides 121-1 with an amplifier in a similar fashion as the interface with an electronic control module. That is, sets of miter bends can be displaced in the y dimension relative to one another to offset inputs and/or outputs to the amplifier for easier coupling. An example of such a configuration is depicted in FIGS. 6A and 6B.

Each waveguide 122 of the first 121-1 and second 121-2 sets of waveguides can also include one or more polarization rotators to control the polarization of microwaves signals in to and out of the beamformer 100. For the example beamformer 100 of FIG. 5, each waveguide of the first set 121-1 includes a respective first rotator1 and each waveguide of the second set 121-2 includes a respective second rotator0. The rotators can rotate the polarization of microwave signals about any desired angle to improve functionality of the beamformer 100. Traversing planes via miter bends can cause the polarization of signals to rotate, which can be compensated by rotator0 and rotator1. Rotating the polarization state of signals can also be beneficial if, for instance, the antennas 130 and/or Rotman lens 111 operate in a preferred polarization state. For example, the rotators can rotate the polarization state of the microwave signals such that they are polarized parallel or perpendicular to the linear antenna array 130 when they are transmitted by the antennas 130. Alternatively, or in addition, the rotators can rotate the polarization state of the microwave signals such that they are polarized parallel or perpendicular to the principal plane 110 when they propagate through the Rotman lens 111. Examples of polarization rotators, as well as further details related to Rotman based beamformers for transmitting and receiving in different polarization states, are described in U.S. Pub. No. 11,699,861 B2 entitled "Perpendicular Rotman Phased Array Front End Device", which is incorporated by reference herein in its entirety.

FIG. 6A is an isometric render depicting an example of a TX beamformer 100b with a folded geometry. TX beamformer 100b includes a series of stacked planes 110, 120-1, 120-2, 120-3, 120-4, and 120-5 that support different components of the beamformer 100b. A principal plane 110 hosts a Rotman lens 111 that interfaces with a first set of coplanar waveguides 121-1 and a second set of coplanar waveguides 121-2. Planes 120-1, 120-2 and 120-4 support the first set of waveguides 121-1, while plane 120-3 supports the second set of waveguides 121-2. Plane 120-5 supports inputs (e.g., lens ports) to the second set of waveguides 121-2 that can be coupled to an electronic control module.

As illustrated in FIG. 6A, the planes in combination with miter bends, enable various functions of the compact, high density beamformer 100.

Miter bends are displaced in the y dimension between planes 120-3 and 120-5 to offset lens ports to the second set of waveguides 121-2 when interfacing with an electronic control module. Offset lens ports provide sufficient area for coupling to the control module that would otherwise demand reduced waveguide densities.

Miter bends are displaced in the y dimension between planes 120-1 and 120-2 to implement staggered delay lines for the first set of waveguides 121-1, varying relative path lengths of microwave signals. Additionally, miter bends are displaced between planes 120-2 and 120-4 to offset waveguides 121-1 when interfacing with an amplifier.

FIG. 6B is a side view render depicting the example beamformer 100 of FIG. 6A including horn antennas 130 (horns). An arrowed line designates the path of microwave signals traversing the beamformer 100. Signals 140 are output from TX_module0, phase-shifted 141 by the Rotman lens 111, and subsequently transmitted 142 from the antennas 130. As illustrated in FIG. 6B, various operations are performed by different components of the beamformer 100 as microwave signals propagate throughout.

WG_run0-5 show extended lengths of coplanar waveguides 121-1/121-2. Transition0 indicates the transition from the second set of waveguides 121-2 to beam ports while transition1 indicates the transition from array ports to the first set of waveguides 121-1. Dielectric puck refers to a dielectric insert 112 that guides microwaves signals between array ports and beam ports. Twelve sets of miter bends are denoted by miter0-9, sim_miter0 and sim_miter1, which redirect waveguides at 90 degrees between the planes.

As can be seen in FIG. 6B, miter bends of miter7 and miter8, as well as sim_miter0 and sim_miter1, are displaced in the y direction to offset waveguides 121-1 in the fourth plane 120-4. Consequently, in the fourth plane 120-4, the first set of waveguides 121-1 is composed of two rows of waveguides with half the density of a single row, creating sufficient area to couple to an amplifier. With a (low-noise) amplifier (LNA) module installed, sim_miter0 and sim_miter1 are replaced with a pair of waveguide-to-microstrip (WG-MS) transitions for each waveguide of the first set 121-1. Microstrips enable appropriate coupling to the amplifier. The ability to implement the amplifier on a dense set of waveguides 121-1 is one significant advantage of the folded beamformer 100. In traditional approaches, a high port and waveguide density, e.g., for achieving enhanced angular resolution, is often sacrificed since microwave signals generally involve amplification before or after interacting with the antennas 130. The need for suitable signal gain is compounded in the mmW spectrum due to significant signal attenuation in a surrounding environment, e.g., absorption of transmitted signals 142 by atmospheric gases. However, folded beamformer 100 can realize enhanced angular resolution and suitable signal gain simultaneously while retaining a compact form factor.

Sets of polarization rotators are indicated by rotator0-3 which rotate the polarization state of the microwaves signals by specified angles. Each waveguide of the first set and/or the second set can include a respective polarization rotator.

Figures 7A, 7B:
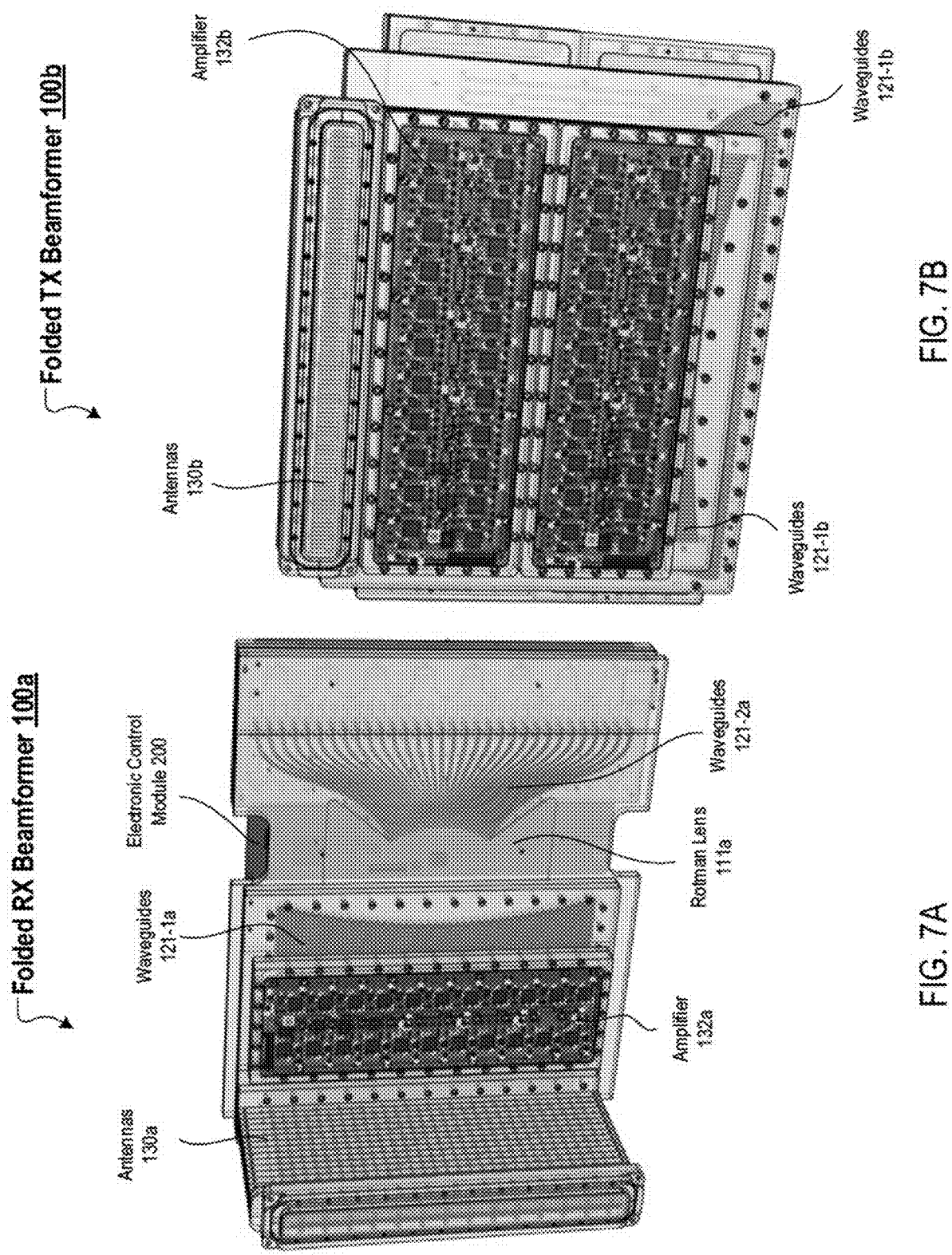
FIGS. 7A and 7B are isometric renders depicting examples of receiver (RX) and transmitter (TX) beamformers with folded geometries, respectively.

FIGS. 7A and 7B are isometric renders depicting an example of a receiver (RX) beamformer 100a and an example of a transmitter (TX) beamformer 100b, respectively. Due to their folded geometries that support a high density of waveguiding components, beamformers 100a and 100b can be implemented in the radar system 10 of FIG. 1 to enhance angular resolution while mitigating power loss. In particular, RX beamformer 100a and TX beamformer 100b can be arranged such that their respective antenna arrays 130a and 30b are perpendicular to one another, allowing reception and transmission of microwave signals in two orthogonal directions. The signals can be correlated by an electronic control module 200 in order to detect objects in a field of view of the radar system 100. Perpendicular antenna arrays 130a and 130b can be advantageous to enable two-dimensional (2D) scanning of the field of view, e.g., generating 2D point clouds.

RX beamformer 100a includes a Rotman lens 111a that phase-shifts microwave signals guided between a first set of coplanar waveguides 121-1a and a second set of coplanar waveguides 120-2a. An amplifier 132a interfaces with the first set of waveguides 121-1a to amplify microwaves after they are received by the antennas 130a into a surrounding environment.

Although not shown in FIG. 7B, TX beamformer 100b includes a Rotman lens 111b that phase-shifts microwave signals guided between a first set of coplanar waveguides 121-1b and a second set of coplanar waveguides 120-2b. An amplifier 132a interfaces with the first set of waveguides 121-1a to amplify microwaves before they are transmitted by the antennas 130b to the surrounding environment.

In this case, RX beamformer 100a and TX beamformer 100b support the same number of array ports corresponding to the same number of waveguides in the first sets 121-1a and 121-1b. A large number of array ports generally enhances angular resolution (e.g., −3 dB angular width). However, as observed in FIGS. 7A and 7B, TX beamformer 100b has a greater number of beam ports and a larger number of waveguides in the second set 121-1b than RX beamformer 100a, which can facilitate wide-angle beam scanning with numerous discrete angular steps.

In general, the radar systems disclosed herein can be installed on a movable object to sense an environment surrounding the movable object. A movable object can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some implementations, the movable object can be carried by a living subject, such as a human or an animal. Alternatively, in some examples, the radar system 10 is installed on a stationary object.

In certain examples, the radar system is installed on an autonomous vehicle which may be referred to as an autonomous car, driverless car, self-driving car, robotic car, or unmanned vehicle. An autonomous vehicle can also refer to a vehicle configured to sense its environment and navigate or drive with little or no human input. As an example, an autonomous vehicle may be configured to drive to any suitable location and control or perform all safety critical functions (e.g., driving, steering, braking, and parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the radar system can be integrated into a vehicle as part of an autonomous vehicle driving system. For example, the radar system can provide information about a surrounding environment to a driving system of an autonomous vehicle. An autonomous vehicle driving system can include one or more computing systems that receive information from the radar system 10 about the surrounding environment, analyze the received information, and provide control signals to the vehicle's driving systems (e.g., steering wheel, accelerator, brake, or turn signal).

The radar system can be deployed on a vehicle to determine a spatial disposition or physical characteristic of one or more targets in a surrounding environment. The radar system may, advantageously, have a built-in predictive model for object recognition or high-level decision making. For example, the predictive model can determine one or more properties of a detected object (e.g., materials, volumetric composition, type, color, etc.) based on radar data. Alternatively, or in addition, the predictive model can run on an external system such as the computing system of the vehicle.

The radar system can be mounted to any side of the vehicle, or to one or more sides of the vehicle, e.g., a front side, rear side, lateral side, top side, or bottom side of the vehicle. The system can be oriented to detect one or more targets in front of the vehicle, behind the vehicle, or to the lateral sides of the vehicle. A target can be any object external to the vehicle. The target can be a living being or an inanimate object. The target may be a pedestrian, an animal, a vehicle, a building, a signpost, a sidewalk, a sidewalk curb, a fence, a tree, or any object that may obstruct a vehicle travelling in any given direction. The target can also be stationary, moving, or capable of movement.

A target object can be located in the front, rear, or lateral side of the vehicle. The target object may be positioned at a range of about 1 meter (m), 2 m, 3 m, 4 m, 5 m, 10 m, 15 m, 20 m, 25 m, 50 m, 75 m, or 100 m from the vehicle. The target can be located on the ground, in the water, or in the air. The target object can be oriented in any direction relative to the vehicle. A target object can be orientated to face the vehicle or oriented to face away from the vehicle at an angle ranging from 0 degrees to 360 degrees. A target may have a spatial disposition or characteristic that can be measured or detected. Spatial disposition information can include information about the position, velocity, acceleration, and other kinematic properties of the target relative to the terrestrial vehicle. A characteristic of a target can include information on the size, shape, orientation, volumetric composition, and material properties, such as reflectivity, material composition, of the target or at least a part of the target.

A surrounding environment can be an external location and/or setting in which the vehicle operates. The surrounding environment can be an indoor or outdoor space, for example, in an urban, suburban, or rural setting, as well as in a high altitude or low altitude setting. The surrounding environment can also include settings that provide poor visibility (nighttime, heavy precipitation, fog, particulates in the air). The surrounding environment can include targets that are on a travel path of a vehicle, outside of a travel path of a vehicle, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A beamformer, comprising:
   a linear array of microwave antennas configured to transmit or receive microwave signals within a field of view of the beamformer;
   a principal plane comprising:
     a Rotman lens comprising a dielectric insert bounded by a set of ports, wherein the set of ports comprises a set of array ports and a set of beam ports opposite one another along a first direction in the principal plane, the dielectric insert configured to guide microwave signals between the set of array ports and the set of beam ports;
     a first set of coplanar microwave waveguides, each waveguide configured to guide microwave signals between a corresponding one of the array ports and a corresponding one of the microwave antennas; and
     a second set of coplanar microwave waveguides, each waveguide of the second set configured to guide microwave signals to or from a corresponding one of the beam ports; and
   a series of one or more first planes parallel to the principal plane, each first plane comprising the first set of waveguides directed in the first direction,
   wherein each plane of the beamformer comprises one or more sets of miter bends, each set of miter bends configured to redirect waveguides of the first set or the second set, each miter bend of each set redirecting a corresponding one of the waveguides to or from a second direction orthogonal to the principal plane.

2. The beamformer of claim 1, wherein the linear array of antennas is arranged along a third direction orthogonal to both the first direction and the second direction.

3. The beamformer of claim 2, wherein one of the first planes has a first set of miter bends redirecting waveguides of the first set to the antennas, and the first set of miter bends are collinear along the third direction.

4. The beamformer of claim 1, wherein the Rotman lens is configured to phase-shift microwave signals guided between the set of array ports and the set of beam ports.

5. The beamformer of claim 4, wherein phase shifts of microwave signals correspond to directions of microwave signals transmitted or received by the microwave antennas within the field of view of the beamformer.

6. The beamformer of claim 1, further comprising:
   a microwave amplifier coupled to each waveguide of the first set and configured to amplify microwave signals guided by the first set of waveguides.

7. The beamformer of claim 6, wherein the microwave amplifier is coupled to each waveguide of the first set by a corresponding pair of waveguide-to-microstrip transitions.

8. The beamformer of claim 7, wherein one of the first planes has a second set of miter bends and a third set of miter bends redirecting waveguides of the first set to the microwave amplifier, the microwave amplifier coupled to each waveguide of the first set between a corresponding one of the miter bends of the second set and a corresponding one of the miter bends of the third set.

9. The beamformer of claim 8, wherein miter bends of the second set and the third set are displaced in the first direction to offset couplings to the microwave amplifier.

10. The beamformer of claim 1, further comprising:
    a series of one or more second planes parallel to the principal plane, each second plane comprising the second set of waveguides directed in the first direction, wherein the principal plane is between the first planes and the second planes.

11. The beamformer of claim 10, wherein the principal plane or one of the second planes has a fourth set of miter bends redirecting waveguides of the second set to a set of lens ports, each waveguide of the second set configured to guide microwave signals to or from a corresponding one of the lens ports, the set of lens ports configured to transmit or receive microwave signals out of or in to the beamformer.

12. The beamformer of claim 11, wherein miter bends of the fourth set are collinear along a third direction orthogonal to both the first direction and the second direction.

13. The beamformer of claim 11, wherein miter bends of the fourth set are displaced in the first direction to offset the lens ports.

14. The beamformer of claim 1, wherein each plane of the beamformer has a corresponding set of miter bends for each adjacent plane, and
    wherein waveguides of the first set are redirected between the principal plane and the first planes by corresponding sets of miter bends.

15. The beamformer of claim 10, wherein waveguides of the second set are redirected between the principal plane and the second planes by corresponding sets of miter bends.

16. The beamformer of claim 15, wherein miter bends of at least some of the corresponding sets are displaced in the first direction to alter path lengths of microwave signals guided by, at least one of, the first set of waveguides or the second set of waveguides.

17. The beamformer of claim 1, wherein the set of ports comprises a set of dummy ports arranged between the set of array ports and the set of beam ports, the dielectric insert configured to guide spillover microwave signals from the set of array ports and the set of beam ports to the set of dummy ports, the set of dummy ports configured to suppress reflections of spillover microwave signals within the dielectric insert.

18. The beamformer of claim 17, wherein the principal plane comprises one or more microwave absorbers bounding the set of dummy ports, each absorber configured to absorb spillover microwave signals guided to the set of dummy ports.

19. The beamformer of claim 17, wherein the principal plane comprises:
   a set of microwave dummy loads configured to absorb spillover microwave signals; and
   a third set of coplanar microwave waveguides, each waveguide of the third set configured to guide spillover microwave signals from a corresponding one of the dummy ports to a corresponding one of the microwave dummy loads.

20. The beamformer of claim 1, wherein the dielectric insert has a biconvex shape with a first radius of curvature and a second radius of curvature, the set of array ports arranged on a first contour of the dielectric insert having the first radius of curvature and the set of beam ports arranged on a second contour of the dielectric insert having the second radius of curvature.

21. The beamformer of claim 1, wherein each waveguide of the first set comprises a first polarization rotator configured to rotate polarizations of microwave signals by a first angle.

22. The beamformer of claim 1, wherein each waveguide of the second set comprises a second polarization rotator configured to rotate polarizations of microwave signals by a second angle.

23. The beamformer of claim 1, wherein the dielectric insert comprises quartz.

24. A radar system, comprising:
   a receiver (RX) beamformer comprising:
      a linear array of RX microwave antennas configured to receive microwave signals reflected from objects within a field of view of the radar system;
      a RX principal plane comprising:
         a RX Rotman lens comprising a set of RX array ports and a set of RX beam ports;
         a first set of coplanar RX microwave waveguides, each RX waveguide configured to guide microwave signals to a corresponding one of the RX array ports from a corresponding one of the RX antennas; and
         a second set of coplanar RX microwave waveguides, each RX waveguide of the second set configured to guide microwaves signals from a corresponding one of the RX beam ports; and
      a series of one or more first RX planes parallel to the RX principal plane, each first RX plane comprising the first set of RX waveguides;
   a transmitter (TX) beamformer comprising:
      a linear array of TX microwave antennas configured to transmit microwave signals toward objects within the field of view of the radar system;
      a TX principal plane comprising:
         a TX Rotman lens comprising a set of TX array ports and a set of TX beam ports;
         a first set of coplanar TX microwave waveguides, each TX waveguide configured to guide microwave signals from a corresponding one of TX array ports to a corresponding one of the TX microwave antennas; and
         a second set of coplanar TX microwave waveguides, each TX waveguide of the second set configured to guide microwave signals to a corresponding one of TX beam ports;
      a series of one or more first TX planes parallel to the TX principal plane, each first TX plane comprising the first set of TX waveguides; and
      a series of one or more second TX planes parallel to the TX principal plane, each second TX plane comprising the second set of TX waveguides, wherein the TX principal plane is between the first TX planes and the second TX planes; and
   an electronic control module in communication with the RX beamformer and the TX beamformer, the electronic control module programmed to correlate reception of microwave signals by the RX beamformer and transmission of microwave signals by the TX beamformer to determine information about objects within the field of view of the radar system based on received microwave signals and transmitted microwave signals.

25. The radar system of claim 24, wherein the RX beamformer comprises a RX microwave amplifier coupled to each RX waveguide of the first set and configured to amplify microwave signals directed by the first set of RX waveguides, and
   wherein the TX beamformer comprises a TX microwave amplifier coupled to each TX waveguide of the first set and configured to amplify microwave signals directed by the first set of TX waveguides.

26. The radar system of claim 24, wherein the electronic control module is configured to receive microwave signals guided by the second set of RX waveguides and transmit microwave signals guided by the second set of TX waveguides.

27. The radar system of claim 26, wherein the electronic control module comprises:
   a waveform generator programmed to generate a conditioning signal;
   a serializer/deserializer ("SERDES") comprising a serializer programmed to serialize transmitted microwave signals conditioned on the conditioning signal and a deserializer programmed to deserialize received microwave signals; and
   a pulse compressor programmed to process deserialized microwave signals and the conditioning signal to correlate received microwave signals and transmitted microwave signals.

28. The radar system of claim 24, wherein the RX beamformer and the TX beamformer are arranged so that the linear array of RX antennas and the linear array of TX antennas are perpendicular to one another.

29. The radar system of claim 24, wherein a number of RX array ports is equal to a number of TX array ports.

30. The radar system of claim 24, wherein a number of RX beam ports is less than a number of TX beam ports.

* * * * *